United States Patent [19]
Andersson et al.

[11] Patent Number: 6,130,731
[45] Date of Patent: Oct. 10, 2000

[54] LIQUID CRYSTAL DEVICES USING A LINEAR ELECTRO-OPTIC EFFECT

[75] Inventors: Gunnar Andersson, Göteborg; Ingolf Dahl, Mölndal; Lachezar Komitov; Sven Torbjörn Lagerwall, both of Göteborg; Kent Skarp, Lindome; Bengt Stebler, Göteborg, all of Sweden

[73] Assignee: S.T. Lagerwall S.A.R.L., Bandol, France

[21] Appl. No.: 08/857,860

[22] Filed: May 16, 1997

Related U.S. Application Data

[62] Division of application No. 08/479,404, Jun. 7, 1995, Pat. No. 5,847,790, which is a continuation of application No. 08/267,001, Jun. 21, 1994, abandoned, which is a continuation of application No. 08/083,292, Jun. 29, 1993, abandoned, which is a continuation-in-part of application No. 07/944,005, Sep. 14, 1992, abandoned, which is a continuation of application No. 07/793,274, Nov. 8, 1991, abandoned, which is a continuation of application No. 07/585,052, Dec. 12, 1990, abandoned.

[30] Foreign Application Priority Data

Feb. 16, 1989 [SE] Sweden ........................... 8900563

[51] Int. Cl.[7] ................... G02F 1/141; G02F 1/1347; G02F 1/1335
[52] U.S. Cl. .................... 349/77; 349/100; 349/117; 349/106; 349/196; 349/57; 349/172
[58] Field of Search ............... 349/77, 172, 173, 349/100, 117, 106, 196, 57; 359/316, 495, 496, 640

[56] References Cited

U.S. PATENT DOCUMENTS

| 3,784,280 | 1/1974 | Bigelow . |
| 3,972,587 | 8/1976 | Scheffer . |

(List continued on next page.)

FOREIGN PATENT DOCUMENTS 0 219 480   4/1987   European Pat. Off. .

OTHER PUBLICATIONS

J. Patel et al., "Properties and applications of ferro–electric liquid cyrstals", Optical Engineering, May 1987, vol. 26, No. 5, pp. 373–384.

(List continued on next page.)

*Primary Examiner*—Kenneth Parker
*Assistant Examiner*—Tai V. Duong
*Attorney, Agent, or Firm*—Young & Thompson

[57] ABSTRACT

A device for influencing light has a polarizer, a ferroelectric or electroclinic response type liquid crystal halfwave plate whose liquid crystals are in the smectic phase with bookshelf geometry and have molecular axes which are rotatable around a first direction corresponding to the direction of incoming light in response to an electric field applied across the electrodes on either side of the halfwave plate, a quarter wave retarder plate, and a mirror. The polarizer, plates and mirror are arranged such that incoming light is passed from the polarizer through the liquid crystal plate and the retarder plate, and is reflected by the mirror in a second direction opposite to the first direction back through the retarder and the liquid crystal plate so as to provide a reflected polarized light plane to the polarizer. The polarizer has a first polarization direction set parallel to one electrically selectable molecular axis direction of the liquid crystal molecules, which is selected in response to a first electric field level. The retarder plate has its slow axis inclined either 45° or 135° relative to the optic axis of the liquid crystal. The liquid crystal, furthermore, is of a material which produces an angular difference 2θ in optic axis direction in response to a second electric field level whose polarity is opposite that of the first electric field level. This allows the device to rotate the reflected polarized light plane by an angle of 8θ in response to the second electric field level.

11 Claims, 13 Drawing Sheets

U.S. PATENT DOCUMENTS

| | | |
|---|---|---|
| 4,239,349 | 12/1980 | Scheffer . |
| 4,394,069 | 7/1983 | Kaye . |
| 4,410,238 | 10/1983 | Hanson . |
| 4,416,514 | 11/1983 | Plummer . |
| 4,451,123 | 5/1984 | McNeill et al. . |
| 4,589,030 | 5/1986 | Kley . |
| 4,725,129 | 2/1988 | Kondo et al. . |
| 4,729,642 | 3/1988 | Kaneko . |
| 4,917,475 | 4/1990 | Meyer et al. . |
| 4,927,244 | 5/1990 | Bahr et al. . |
| 5,132,826 | 7/1992 | Johnson et al. . |
| 5,168,381 | 12/1992 | Walba . |
| 5,247,379 | 9/1993 | Andersson et al. ............... 349/168 |

OTHER PUBLICATIONS

Z. Li et al., "Linear Electroclinic Effect in a Chiral Nematic Liquid Crystals", Physical Review Letters, Feb. 13, 1989, vol. 62, No. 7, pp. 796–799.

S. Lagerwall et al., "Ferroelectric Liquid Crystals for Displays", 1985 International Display Research Conference, 1985, IEEE, pp. 213–221.

G. Andersson et al., "Device physics of the soft–mode electro–optic effect", J. Appl. Phys., Nov. 15, 1989, vol. 66, No. 10, pp. 4983–4995.

G. Andersson et al., "Submicrosecond electro–optic switching in the liquid–crystal smectic A phase: The soft–mode ferroelectric effect", Appl. Phys. Lett., Aug. 31, 1987, vol. 51, No. 9, pp. 640–642.

G. Andersson et al., "The Soft–Mode Ferroelectric Effect", Ferroelectrics, 1988, vol. 84, pp. 285–315.

G. Dir, "Variable Neutral Density Device", Xerox Disclosure Journal, Jun. 1976, vol. 1, No. 6, pp. 79–80.

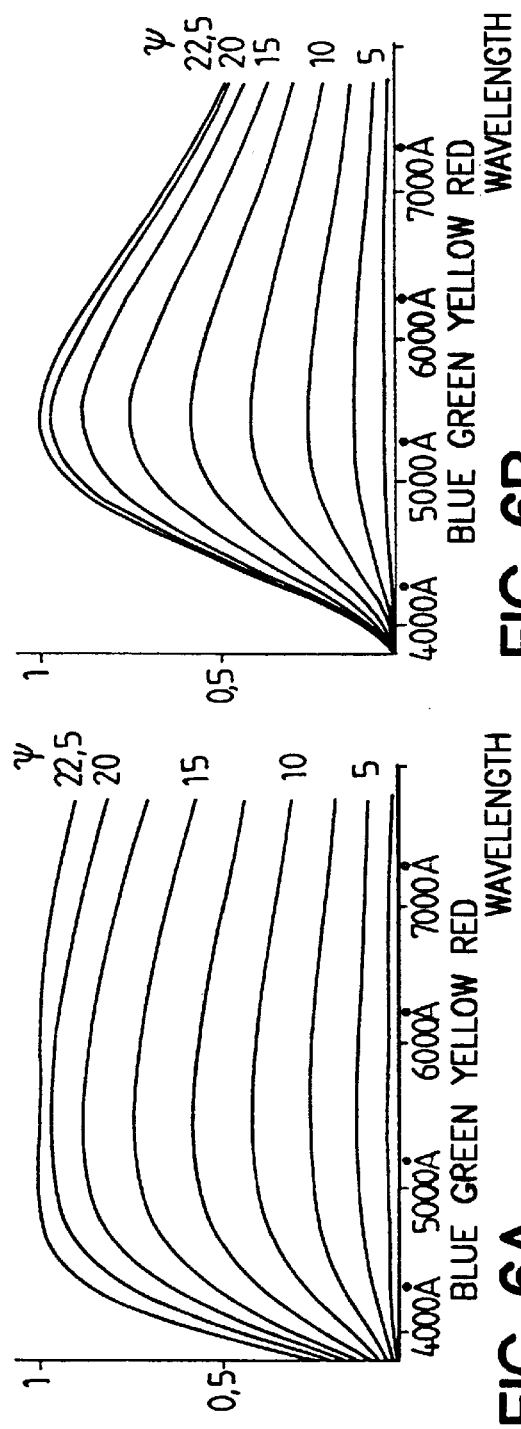
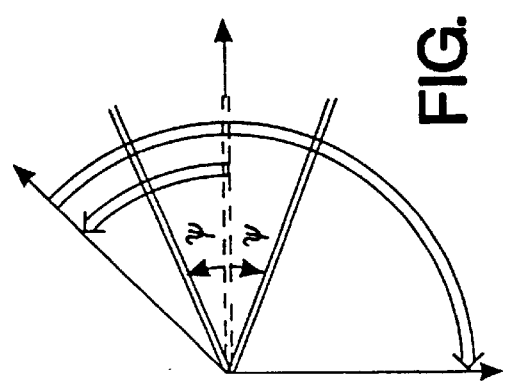
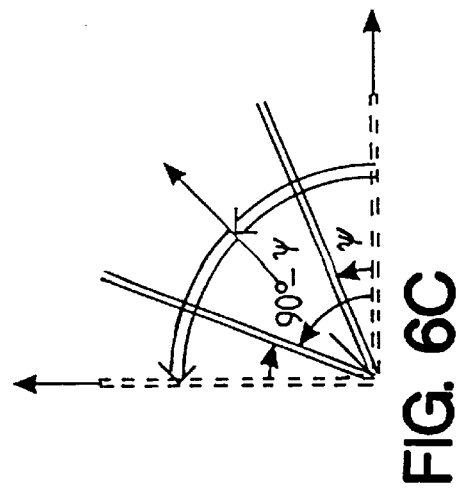
FIG. 6A
FIG. 6B
FIG. 6C
FIG. 6D

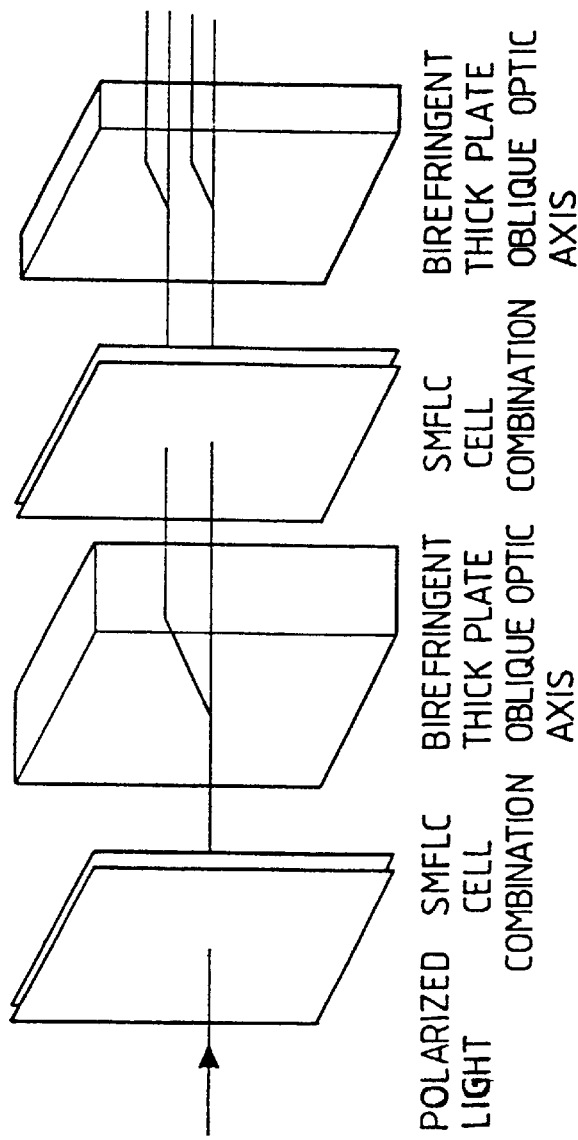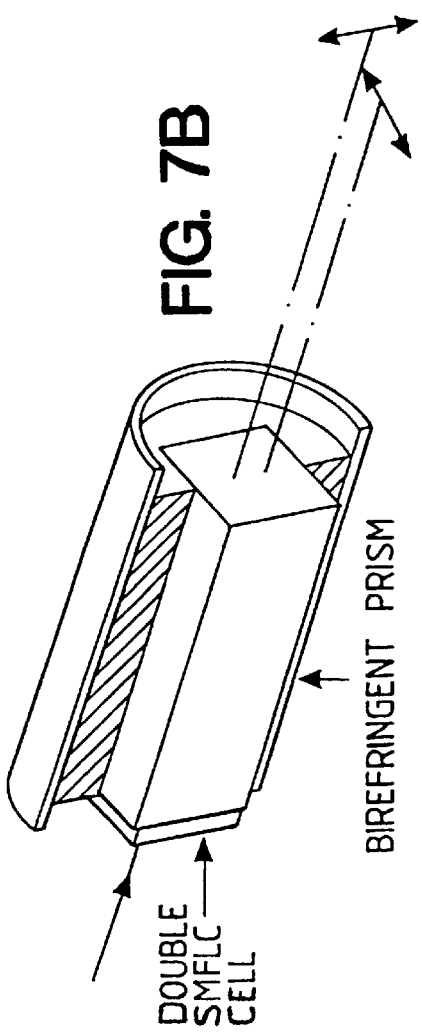
FIG. 7A
FIG. 7B

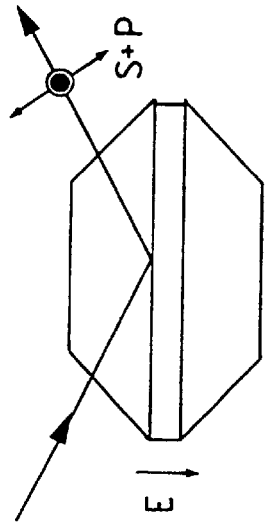
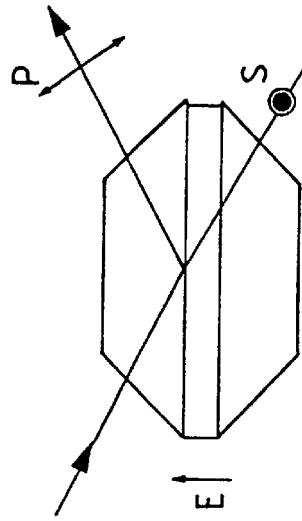
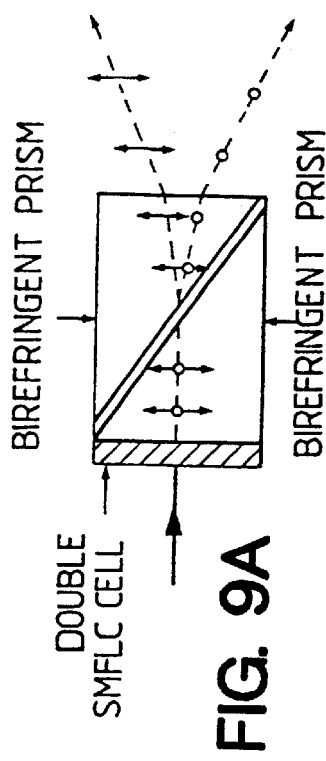
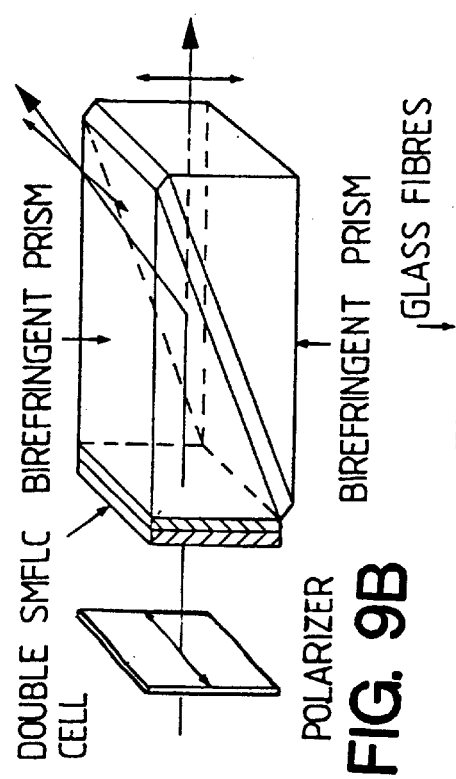
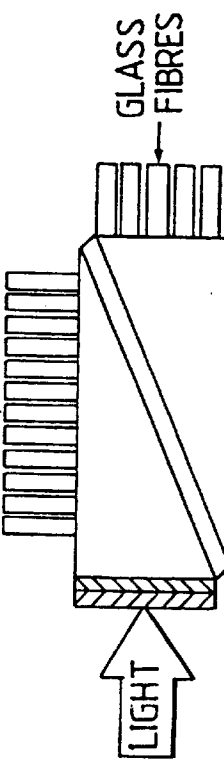

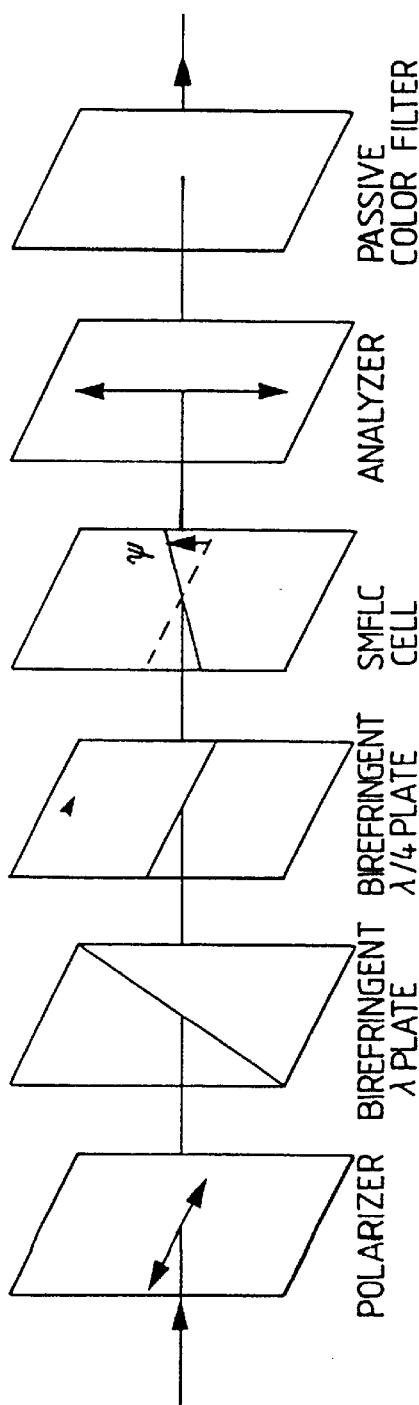
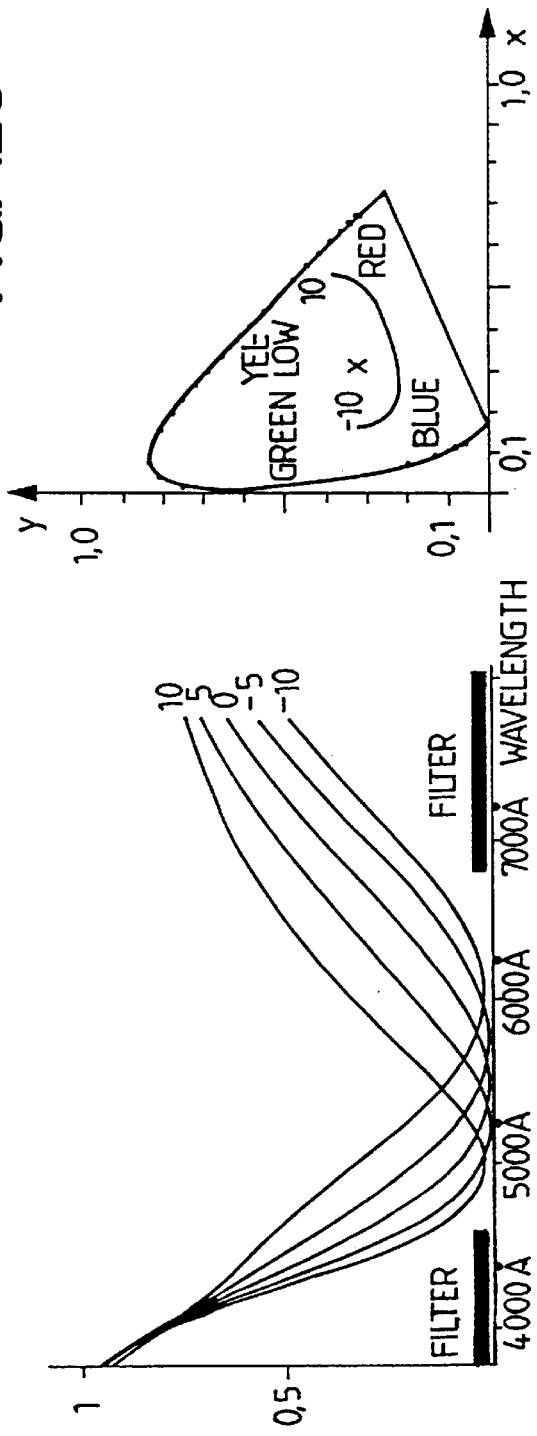
FIG. 12C
FIG. 12B
FIG. 12A

LIQUID CRYSTAL DEVICES USING A LINEAR ELECTRO-OPTIC EFFECT

This application is a division of application Ser. No. 08/479,404, filed Jun. 7, 1995, now U.S. Pat. No. 5,847,790, which is a file wrapper continuation of Ser. No. 08/267,001, filed Jun. 21, 1994, now abandoned, which is a file wrapper continuation of Ser. No. 08/083,292, filed Jun. 29, 1993, now abandoned, which is a continuation-in-part of Ser. No. 07/944,005, filed Sep. 14, 1992, now abandoned, which is a file wrapper continuation of Ser. No. 07/793,274, filed Nov. 8, 1991, now abandoned, which is a file wrapper continuation of Ser. No. 07/585,052, filed Dec. 12, 1990, now abandoned.

FIELD OF THE INVENTION

The present invention relates to liquid crystal devices exhibiting an electrooptic effect which is linear in the electric field. Examples of such devices are those using tilted chiral smectic materials, in which the utilized effect is based on a ferroelectric response, or those using orthogonal chiral smectic materials using the electroclinic effect. Electroclinic effects can be used also in chiral nematic materials.

DESCRIPTION OF PRIOR ART

Surface-stabilized ferroelectric crystals (SSFLC) are capable of powerful electrooptic effects such as the kind described in U.S. Pat. No. 4,367,924 to Clark and Lagerwall, in which the optic axis upon reversal of the sign of an applied electric field swings around a cone to a new direction, ideally inclined at 45° relative to the initial one. If the polarization plane of the incident light lies in this initial direction and if the optical thickness of the liquid crystal is matched to be a $\lambda/2$ plate, then, the exiting light, after having traversed the cell, will have its plane of polarization rotated to a direction which is perpendicular to the polarization plane of the incident light. This condition gives a maximum of contrast and brightness for the electrooptic effect, but requires a smectic cone angle of 22.5° for the smectic material. Very often this condition cannot be met because of a complex layer structure of the smectic liquid crystal of the cell, giving an apparent value of the cone angle, as seen projected in the cell plane, which is considerably smaller than 22.5°, commonly of the order of 7 to 15°. In such a case, the rotation of the polarization plane is considerably less than 90° and the electrooptic effect, though still very rapid, is capable of giving only a fraction of the achievable contrast.

If instead of an SSFLC cell, a so-called soft-mode cell (SMFLC) is employed using an orthogonal chiral smectic liquid crystal (cf. U.S. Pat. No. 4,838,663), the induced shift in optic axis direction on reversing the applied field is always less than required for producing maximum optical contrast. This is also the case when using a chiral nematic instead of a smectic material, only much more pronounced.

A unique feature of the electrooptic response both in the SSFLC and SMFLC mode is that the effective change of the optic axis is a rotation in the plane of the sample, cf. FIG. 1. In both cases, the so-called book-shelf configuration is employed, i.e. with the smectic layers standing essentially perpendicular to the cell glass plates or to the confining surfaces in the case that other materials like polymer foils are used instead of glass substrates. An applied electric field of one sign thus corresponds to an optic axis inclined in one direction relative to the normal cutting the layers in the cell plane, whereas a field of opposite sign induces an inclination of the opposite direction relative to this normal. Thus, the molecules effectively rotate around an axis which is in the direction of the incident light. This is a fundamental feature required by the linearity of the effect, distinguishing this family of devices from other liquid crystal devices, which are based on quadratic effects and in which the rotation axes of the molecules are essentially perpendicular to the direction of light.

BRIEF DESCRIPTION OF THE DRAWINGS

In the drawings:

FIGS. 6A and 6B illustrate, for an electroclinic cell pair comprising a liquid crystalline substance (ZLI-3774 by Merck in its chiral smectic C* phase) of typical optical character (birefringence and wavelength dependence of the refractive indices), the calculated transmission for two set-ups and as a function of induced electroclinic angle ψ and of wavelength. In FIG. 6A an arrangement having the optic axes of the two electroclinic cells at right angles to each other at zero electric field such as that represented by FIG. 6C is shown. In FIG. 6B, the cells' optic axes are arranged parallel to each other, as represented in FIG. 6D. As is illustrated, the turns of the cells' optic axes are to take place in opposite senses. Over the visible range of light, the characteristics illustrated in FIG. 6A are seen to result in an almost ideal achromatic behavior.

FIGS. 7A and 7B illustrate view of a light ray multiplexer, in FIG. 7A being built up by one or more doubling units, and in FIG. 7B, each consisting of an electroclinic cell combination (like that of FIG. 5) along with a thick birefringent plate. The relative intensities of the ray components due to splitting in each birefringent plate are determined by the polarization state of incident light controlled by the electroclinic cells.

FIGS. 9A–9E illustrate examples of optical switchboards, made up of combined doubled SMFLC cells and double birefringent FIGS. 9A–9C or ordinary (FIGS. 9D and 9E) prisms, allowing to electrically control the change in birefringence and thereby the two (or four) outgoing components relative intensities (and the conditions of total reflection).

FIGS. 12A–12C illustrate one example of a colour controlling arrangement, here a sliding-minimum-wavelength filter. As seen in FIG. 12C, a polarizer, a fullwave and a quarter wave plate are followed by a SMFLC cell, an analyzer and finally a passive colour filter, the relative orientations of optical axes marked for each component. The resulting transmission versus wavelength is seen in FIG. 12A, showing the sliding minimum position depending on the SMFLC optical axis tilt (ψ=10.5, 0, −5 or −10 degrees). In FIG. 12C, the corresponding colour change is seen in a CIE diagram.

FIGS. 13A and FIGS. 13B illustrate the transmission spectra of the two pivot filters, showing pivot points at wavelengths 5300 Å and 5750 Å, respectively. FIG. 13C illustrate the "window" in the CIE diagram corresponding to the different hues obtainable if the two pivot filters are varied independently. Stars indicate the blue, green and red phosphors used in cathode ray tubes.

DESCRIPTION OF DEVICE PRINCIPLE AND EMBODIMENTS

If the rotation of the polarization plane is insufficient to produce a high contrast-high brightness effect, this may be remedied by letting the light pass the cell twice, using a reflector. In this case the optimum condition is recovered when a quarterplate retarder is inserted between the reflector and the liquid crystal which has to be a halfwave plate of a material with a tilt θ of 11.25 degrees. Such a value of the tilt, or apparent tilt, is indeed common in many SSFLC cells. A difficulty with this design is that the property of being a halfwave of a quarterwave plate can be fulfilled only for a certain wavelength λ. If not properly made, the design of the compound cell will add the chromaticity of the parts so that the cell is more chromatic than either component. On the contrary, with axis directions carefully chosen, a compensation of the wavelength dependence can be achieved so that the combination is nearly achromatic, i.e. with a flat wavelength transmission characteristics, thus well adapted to process even white light.

A second method to increase an unsufficient rotation of the polarization plane is to use several liquid crystal cells, in series eventually glued into one unit. Again, if this is just made in a repetitive way, the wavelength dependence of the elements will add to an undesired chromaticity, whereas the combination can be made essentially achromatic already in a double cell, by choosing the optic axes orthogonal instead of parallel.

If ferroelectric or electroclinic materials are used for the implementation of (reflective, double or multiple cell) devices described below does not, generally speaking, alter the optical design of these devices. Their use and performance will be different according to the utilized materials. Both give very rapid (submicrosecond) electrooptic response.

Figure 1:
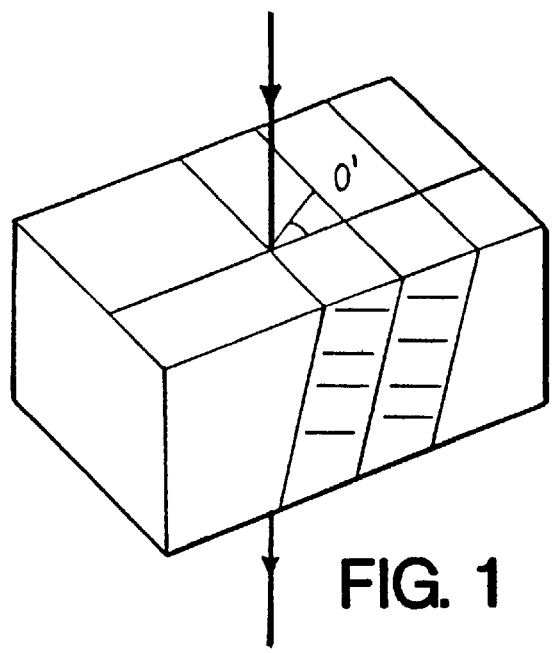
FIG. 1 is a schematic view of the liquid crystal between electroded glass plates, showing the projection θ of the induced molecular tilt θ on the glass plates. Also shown are the projection of the molecular orientation (and the optic axis) in the neutral (field E=0) case. In the case drawn the liquid crystal in a tilted bookshelf geometry.
Figure 2:
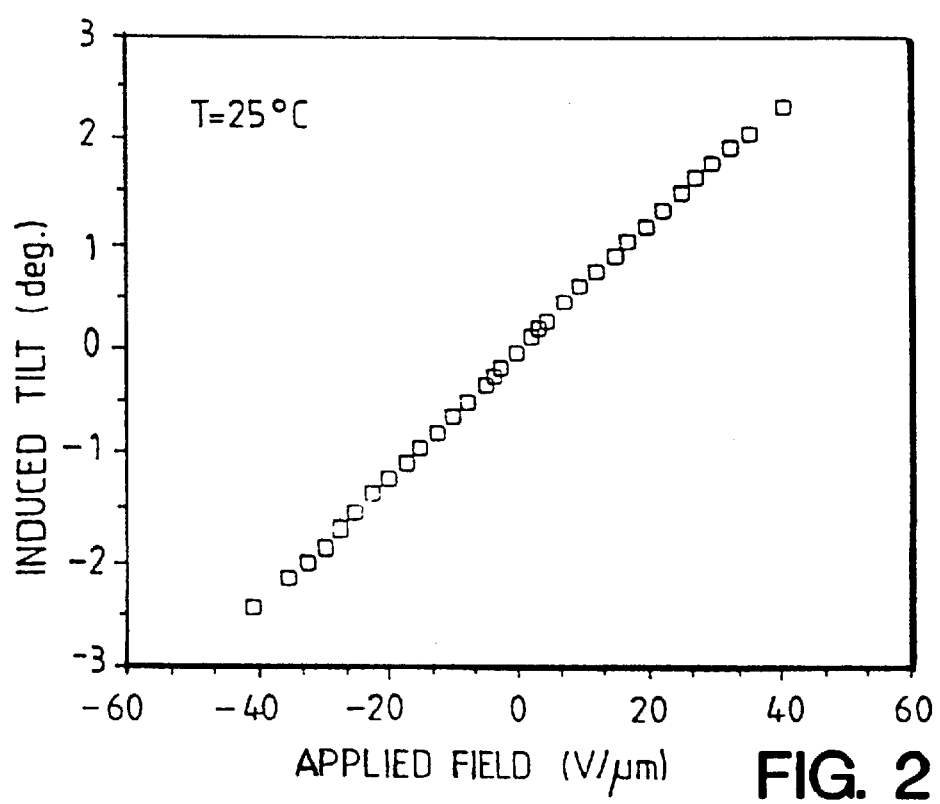
FIG. 2 shows the projection of the induced molecular tilt on the glass plates, as a function of applied voltage at 25° C. The liquid crystal mixture used in this example is 88–158 by Merck.

Whereas the SSFLC cells are characterized by a pronounced threshold, and may switch between two bistable states, the SMFLC cells have no threshold, an induced tilt angle increasing linearly with the applied field E (cf. FIG. 2) and therefore an electrically controlled, continuous greyscale. It is of course also possible to add or mix these properties in a device, filling the different component cells with different materials, ferroelectric and electroclinic, respectively.

One of the most attractive devices for real-time optical processing, incoherent-coherent, and thus also Fourier transformation of images is a spatial light modulator, with an optically addressed photoconductor layer or pixel pattern, acting on liquid crystal. Such a device should operate at high speed and low power, would not require memory, but would greatly benefit from a continuous grey scale. Furthermore, the liquid crystal in this application should preferably work in reflective mode. Thus a single-cell reflective soft-mode device would seem ideal. A surface-stabilized device using a tilted smectic would operate in the same way, but with the maximum contrast, without grey scale.

One possibility to arrange a reflective device is to take a transmissive device, consisting of one λ/2 cell between two crossed polarizers, and place the whole arrangement in front of a mirror. Then, we will gain in contrast compared to a single passage of light through the cell, but at the same time we lose in intensity. The optimum zero-field preset angle $\psi_o$ for maximum light intensity modulation becomes 30°, compared to 22.5° for the simple transmissive device. For a tilt angle swing of ±10°, we could then switch between 17% reflection and 94% reflection, measured relative to the intensity of the incoming linearly polarized light at the optimum wavelength.

Figure 3A:
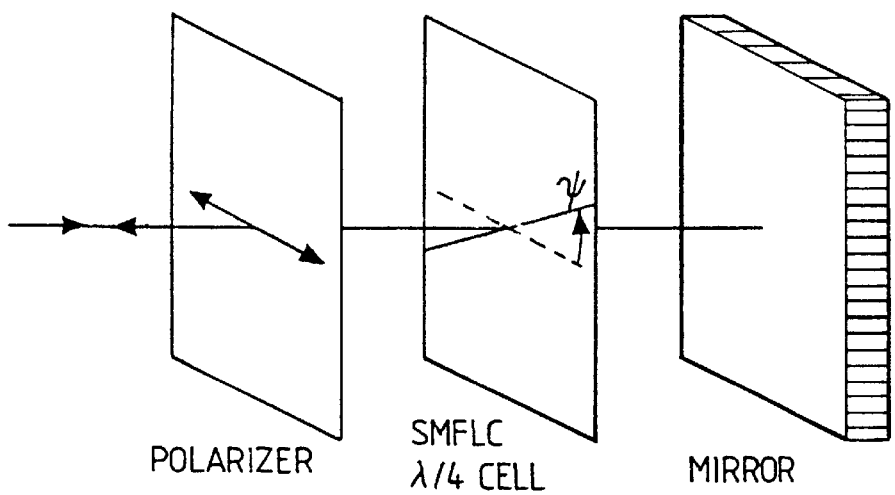
FIGS. 3A and 3B illustrate a reflective single SMFLC cell device, 13A being a simple build-up yet requiring a 45° turn of the optic axis for full modulation, whereas 13B, incorporating a birefringent $\lambda/4$ plate, allows full modulation for a zero to 22.5 degree turn of the optic axis.
Figure 3B:
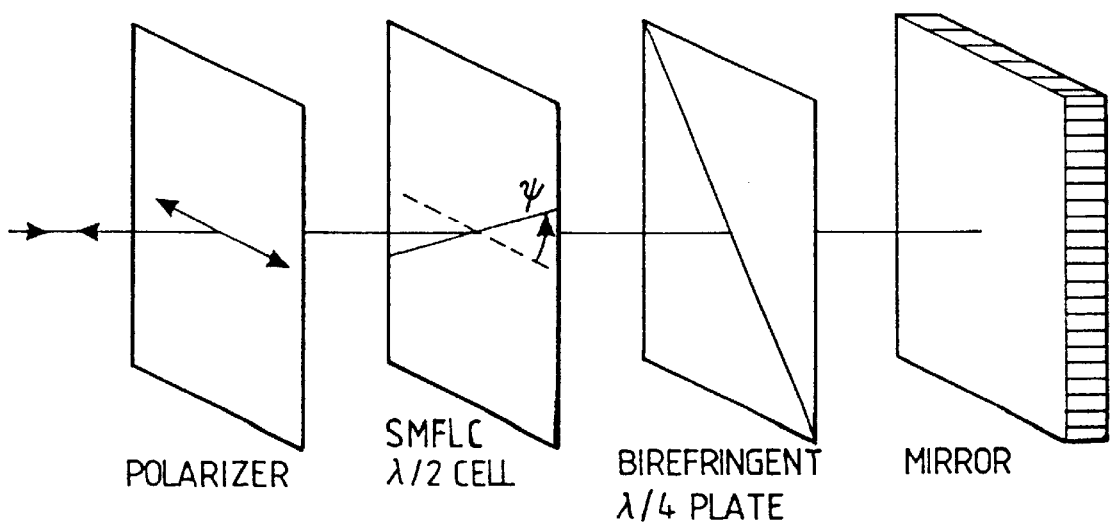
Figure 4:
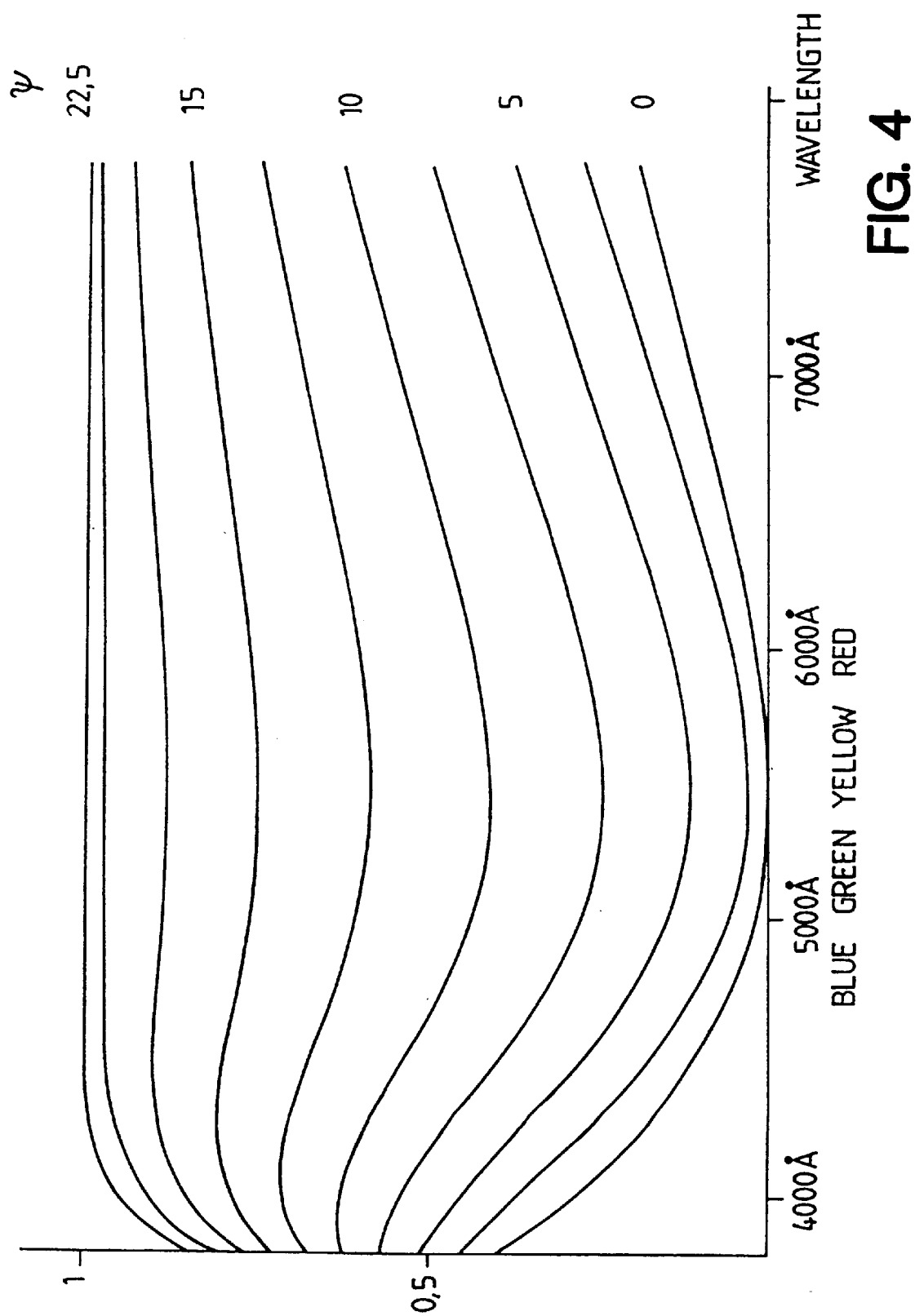
FIG. 4 shows the wavelength dispersion of the transfer properties of the device according to FIG. 3(b), in which the $\lambda/2$ condition for the liquid crystal cell and the $\lambda/4$ condition for the retarder plate is fulfilled at wavelength $\lambda$=5460 Å.

A better arrangement is to replace the polarizer next to the mirror by a λ/4 retarder plate, giving the arrangement in FIG. 3(b). In this device, we use the ability of the mirror to change the state of polarization of light. Linearly polarized light, reflected by a mirror at normal incidence, will still be linearly polarized in the same plane, but circularly polarized light will change its handedness. It is thus possible to see the mirror image if a linear polarizer is placed in front of a mirror. If instead a circular polarizer is placed in front of the mirror, the mirror will appear black. To get full modulation of a ferroelectric liquid-crystal device, it should thus be able to switch the light falling on the mirror, from being linearly polarized to become circularly polarized. This could be accomplished by the λ/4 cell shown in FIG. 3(a), but would require a 45 degree swing of the optic axis to get full modululation. This means it would require a 22.5 degree material, so far only available as SSFLC, not yeat approached by SMFLC. Using a λ/2 cell together with a fixed λ/4 retarder, however, as in the setup of FIG. 3(b), the device can be realized with either C* or A* material, for instance, where the tilt (C*) or the maximum induced tilt (A*) is 11.25 degrees. We can arrange the orientation of the polarizer, the SMFLC cell, and the retarder plate in various ways, but a comparison indicates that the arrangement shown in FIG. 3(b) gives optimum wavelength characteristics: If the slow axis in the case of a soft-mode cell is made to turn between 0° and 22.5° relative to the transmission direction of the polarizer, the slow axis of the λ/4 plate should be at the angle 45° relative to the polarizer. Thus the retarding effects of the active cell and of the fixed retarder plate should to some degree be counteracting. The spectral characteristics of such a device are shown in FIG. 4. The wavelength behavior is comparable to that of a double electroclinic cell (see below), with better achromaticity at maximum reflection, but not so good extinction at minimum reflection. This property could be further optimized by tailoring the dispersion of Δn.

Even if the tendency today goes towards backlit displays, there will always be a need for screens working mainly in reflection—either because of minimum power requirements or because of powerful ambient illumination. For high resolution or video applications, the multiplexed single-cell C* reflective devices, or single-cell A* reflective devices, combined with thin-film transistors offer the most powerful solutions. It might be pointed out that the described arrangement, extended by a suitable polarizer behind a transflective reflector, works at the same time in transmission. A reasonable and simple choice is to optimize brightness for the reflective mode, which has to be paid by a 50% light loss in transmission mode, which can always be compensated by backlighting power.

As we have seen, a single liquid crystal cell is sufficient for adequately amplifying the polarization plane rotation in the reflective mode. In the transmissive mode, a double cell will be necessary. As in the double pass, with two cells in series we can amplify a tilt θ to the value 8θ, when talking of the amount of rotation of polarization. Each cell contributes to a turn of 4θ: an induced tilt angle of 10° could thus by the use of two cells turn the plane of polarization by 80°, and as before, 11.25° of induced tilt is needed if we want to achieve the ideal value of 90°.

Figure 14:
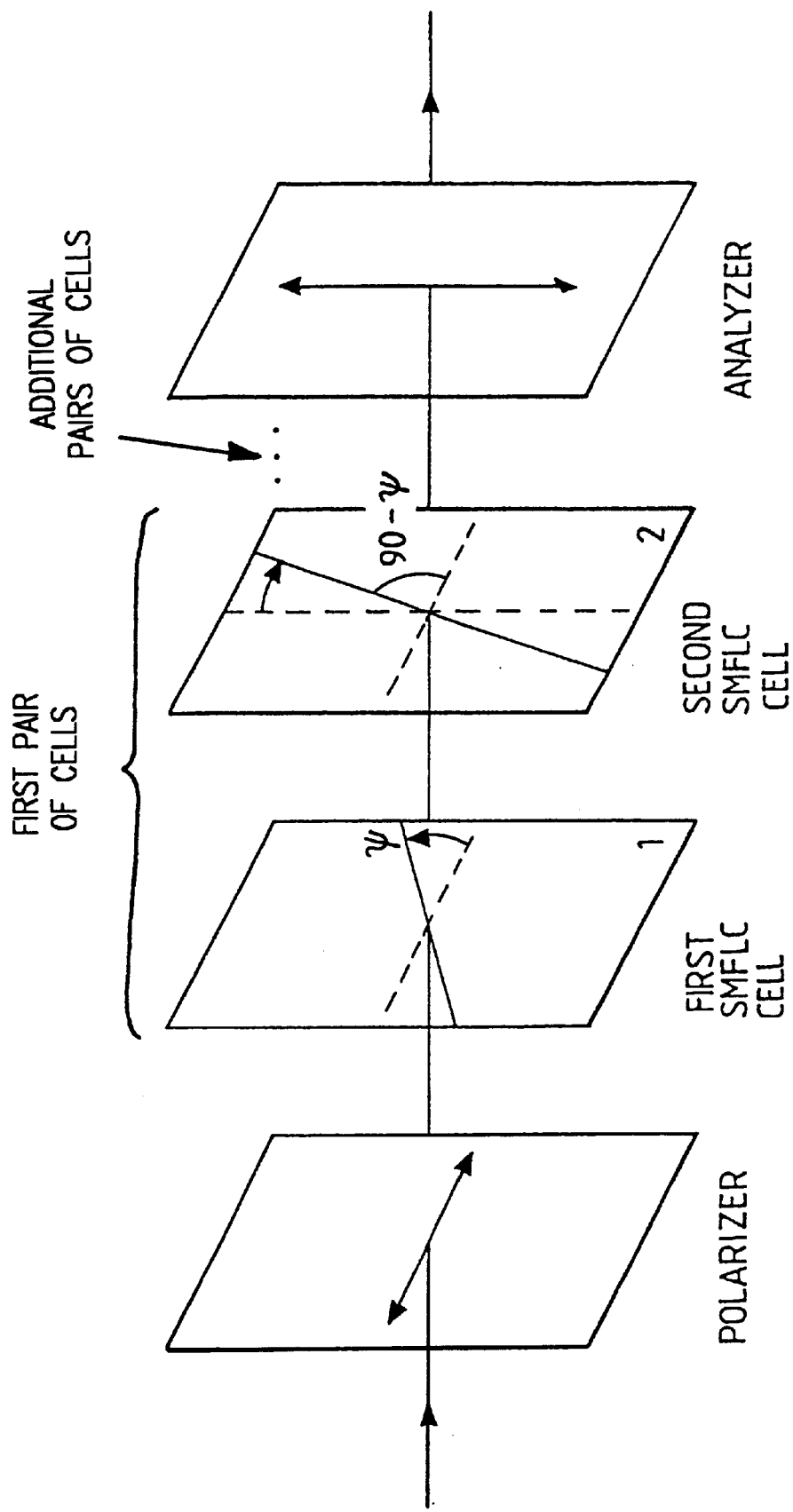
FIG. 14 illustrates the use of multiple pairs of cells to increase optical rotation.

Since the possible change in tilt angle is twice the maximum tilt angle, we see that the maximum tilt angle should be multiplied by 8 to give maximum rotation of the plane of polarization. Moreover, as illustrated in FIG. 14, such pairs can be piled to further enhance the effect: The optical rotation grows linearly with the number of devices.

Figure 5:
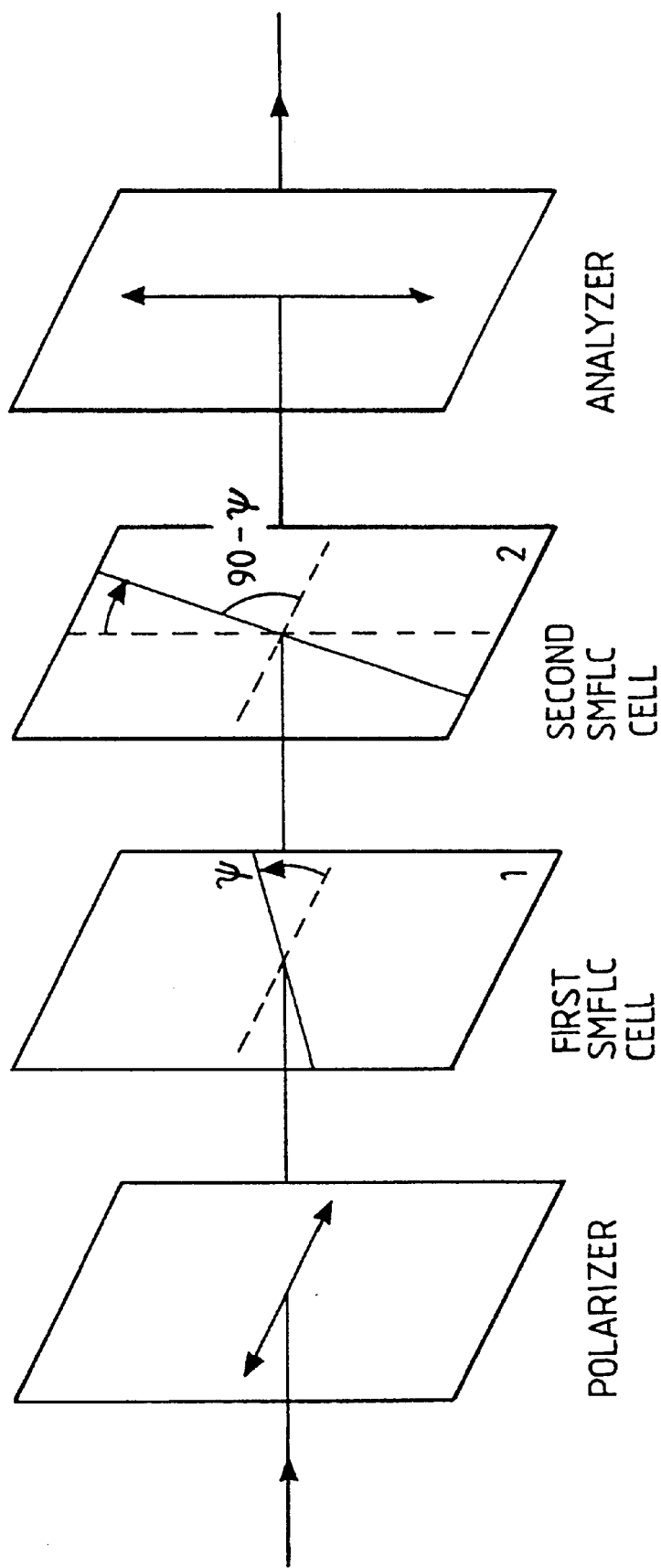
FIG. 5 is a schematic view of an optimized double electroclinic cell between crossed polarizers, in which ψ marks the angle between the optic axis of the first cell and the polarizer, and at the same time –ψ marks the angle between the optic axis of the second cell and the analyzer. ψ varies between 0 degrees, giving extinction, and 22.5 degrees, leading to full transmission.

To obtain the light valve device in practice, we assume that two SMFLC cells are placed between two crossed polarizers, and we want zero transmission at one limiting value of the control voltage and maximum transmission at the other one. The preferred choice is then to place two identical λ/2 cells on top of each other, in such a way that the zero transmission state is obtained when the slow optic axes of the two cells are perpendicular to each other, coinciding with the polarizer and analyzer directions, respectively, as shown in FIGS. 5 and 6(a). When changing the applied voltage, the optic axis of the first cell should swing out counterclockwise to the angle ψ, and the optic axis of the second cell should turn clockwise, to the angle 90°−ψT, measured relative to the polarizer transmission direction. The angle between the optic axes then becomes 90°−2ψ, and the plane of polarization is thus turned the angle 180°−4ψ, which gives a four times magnification, the tilt angle swing needs to be +11.25° and the zero filed azimuth angle $\psi_o$ of the two cells should thus be chosen as 11.25° and 78.75°, respectively. This tilt angle swing is in the range of what is achievable with present materials. In principle, the same operation would be possible if the slow optic axes of the two cells had been parallel in the initial state. The reason why we choose them perpendicular is that the λ/2 condition is only fulfilled for one specific wavelength λ, whereas it is clearly desirable to have the device working in the prescribed mode over as large a wavelength region as possible. By interchanging the fast and slow directions of one of the cells, the chromaticity partly compensates instead of add, so that the combination will show fairly flat wavelength characteristics, especially towards the red-infrared part of the spectrum. The calculated transmission spectra are shown in FIGS. 6A and 6B, where a comparison is made between the two cases. If we pile two such pairs on top of each other (this combination requiring then only half of 11.25° tilt in each single cell for full modulation depth), the wavelength characteristics will become even slightly more flat. As we will see below, this combination of two soft mode cells is also suitable to be included in colour switching devices.

With a continuous varying control voltage, an excellent grey-scale device is achieved, with a contrast high enough (set by the polarizers and the cell quality) to fully utilize the grey-scale dynamics. The price we have to pay is the complexity of two cells and four electrodes. In principle, by filling one cell with one smectic-A mixture and the other with its optical antipode, the same sign of voltage could be used over the two cells, and then in principle a construction with only two electrodes is possible. To make practical devices out of this idea, sheets of smectic-A* or -C* polymer could be laminated in a plywoodlike structure. This would enable close packing without mixing of the optical antipodes. In this context, one might contemplate the basic question about the fundamental prerequisites for the electroclinic effect. Maybe we could expect an electroclinic effect in some polymers, made out of chiral monomers, even without the smectic layer structure. Maybe even the presence of a polymeric backbone could replace the smectic layer structure as symmetry breaking element.

We could thus obtain an optical component that is as fast as a single electroclinic cell, but with possibilities to give full modulation of light or, alternatively, to rotate the polarization plane by 90°. Since we could make use of small tilt angles, we could choose the temperature of the cells a bit further inside the smectic-A phase, away from the phase transition to smectic-C, and make use of the smaller, but faster, and less temperature-dependent electroclinic effect there. The additive properties of multiple electroclinic cells could also be used to make analog or logical addition. There are also numerous applications, where the cells could be combined with polarization-sensitive deflective optical components, to control the light path through an optic system. There are several different polarization-sensitive deflective optical devices available. Such components could use birefringent plates with suitably arranged optic axes, gratings, especially those made of birefringent material, Brewster windows, total internal reflection in birefringent materials, the reflective properties of one-dimensional conductors, etc. By placing electroclinic cell combinations and this other component in alternating order in a row, we could control where the deflection should occur. In this way we could control and scan the lateral position of a light beam, which otherwise is a difficult problem. We could also construct optical switchboards of high speed and with relatively low light losses. These switchboards could be constructed by stacking electroclinic cell pairs together with birefringent plates of different thicknesses and with oblique optic axes as in FIGS. 7A and 7B. Such a device could direct a light beam to any of a large number of exit lines, or vice versa. If the liquid crystal cell pairs are arranged as linear arrays, a big number of entrance lines, by a quite simple, compact, and fast construction. The light absorption in this type of switchboard will only be caused by material imperfections and not by the working principles as such, and thus the light losses could be kept quite small.

Figure 8A:
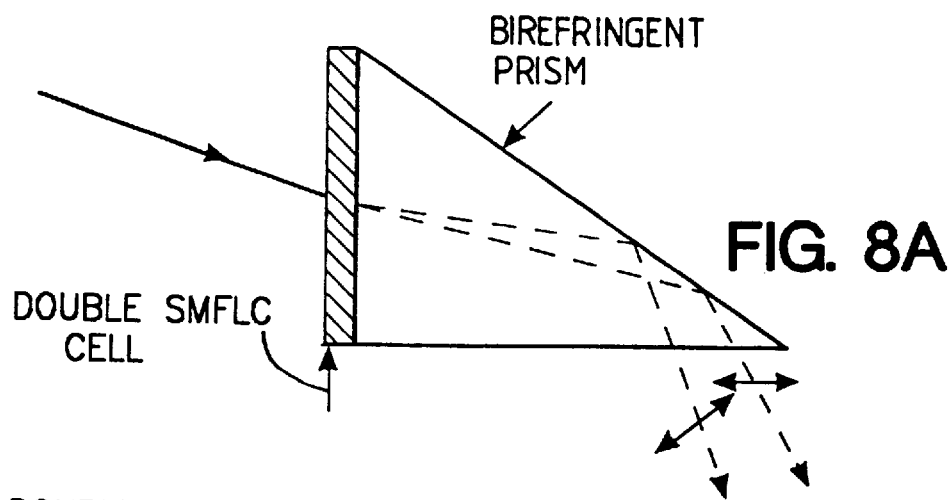
FIG. 8 shows examples of double SMFLC cells glued onto single birefringent prisms, allowing to electrically control the relative intensities of split and deflected light beams.
Figure 8B:
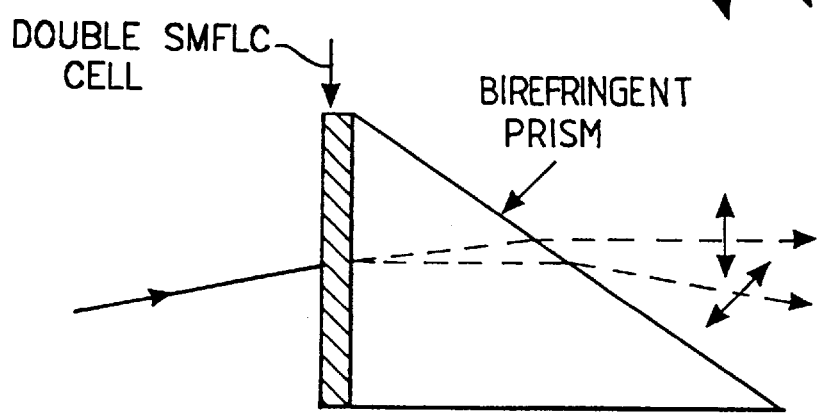
Figure 8C:
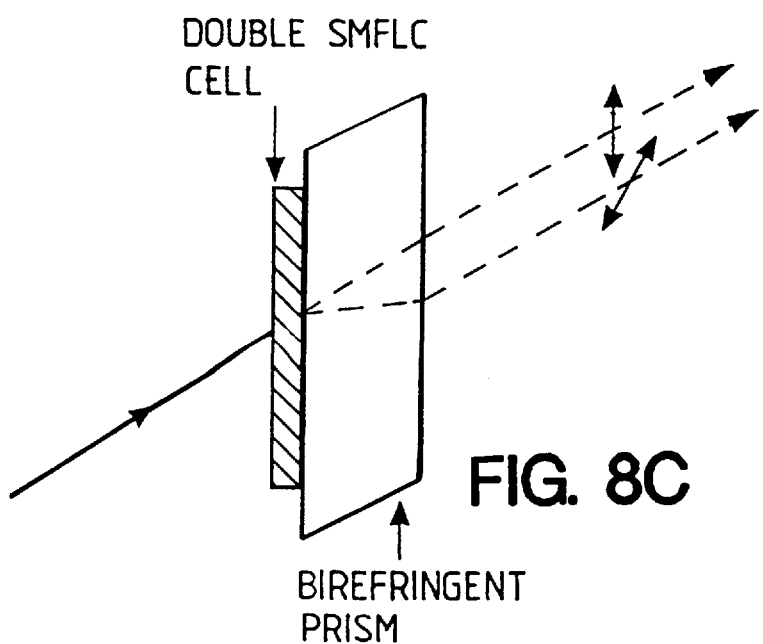

A great number of deviators, beam splitters, beam switchers, phase shifters and polarization switches could be designed either using SSFLC or SMFLC double cells in combination with prisms and retarders. We show some examples of beam splitters in FIG. 8. In FIGS. 9A–9D are shown simple examples of optical switchboards with a double cell in front and a deviator or communications switch with a single cell actively controlling the change in birefringence and thereby the refraction and total reflection. The prism may be a Glan Thompson prism, providing a different polarization state and a directional splitting of light corresponding to the state of an applied electric field.

Figure 10A:
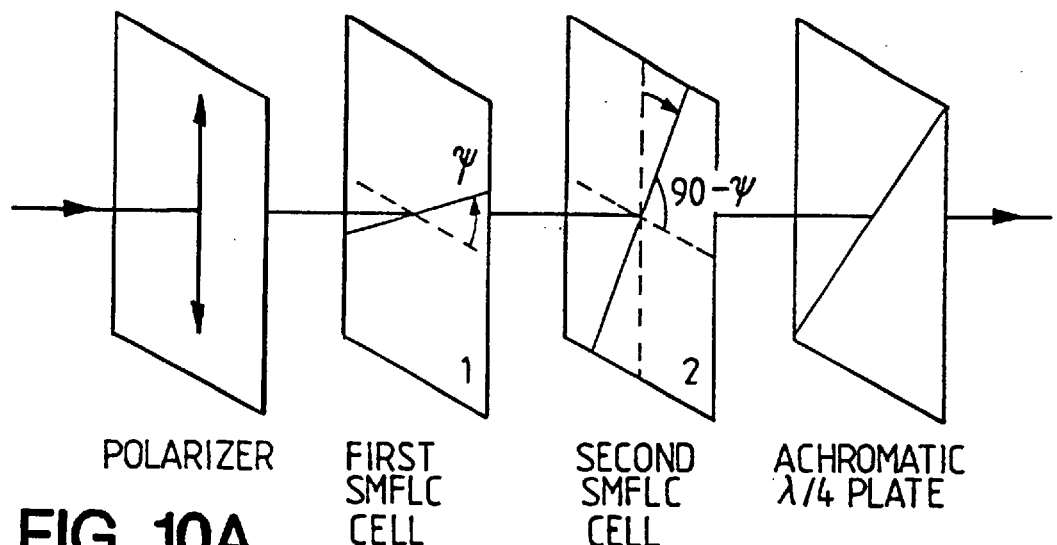
FIG. 10 shows schematically examples of polarization switches combining retarders with double SMFLC cells; on 10(a), for one particular set-up, the relative orientations of polarizer, retarder and of the zero electric field (dashed lines) or switched (angles +ψ or −ψ) optic axes of the SMFLC cells. In 10(b) and (c) are seen arrangements allowing the switching, as illustrated, between orthogonal linearly polarized states via a (zero field) circularly polarized states (in opposite senses) via a (zero field) linearly polarized states.
Figure 10B:
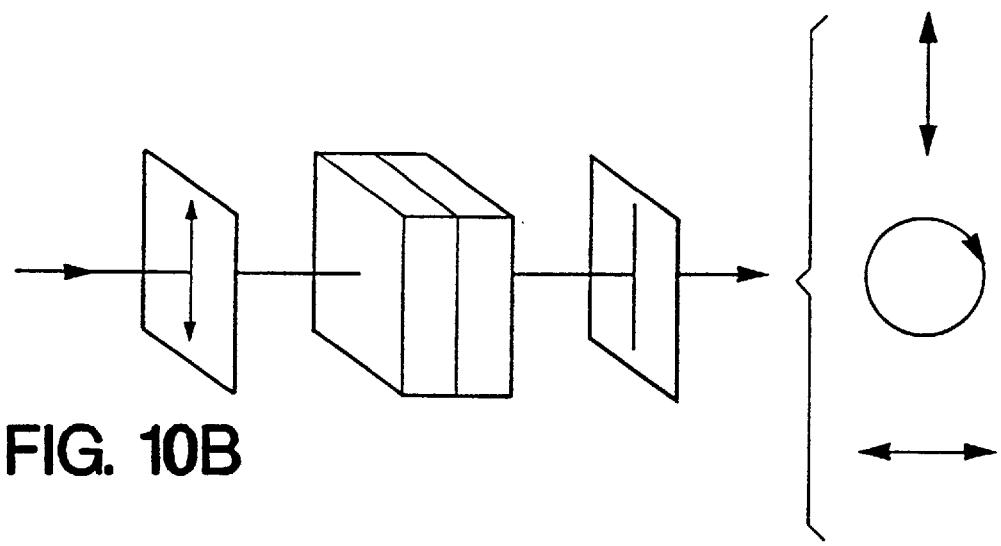
Figure 10C:
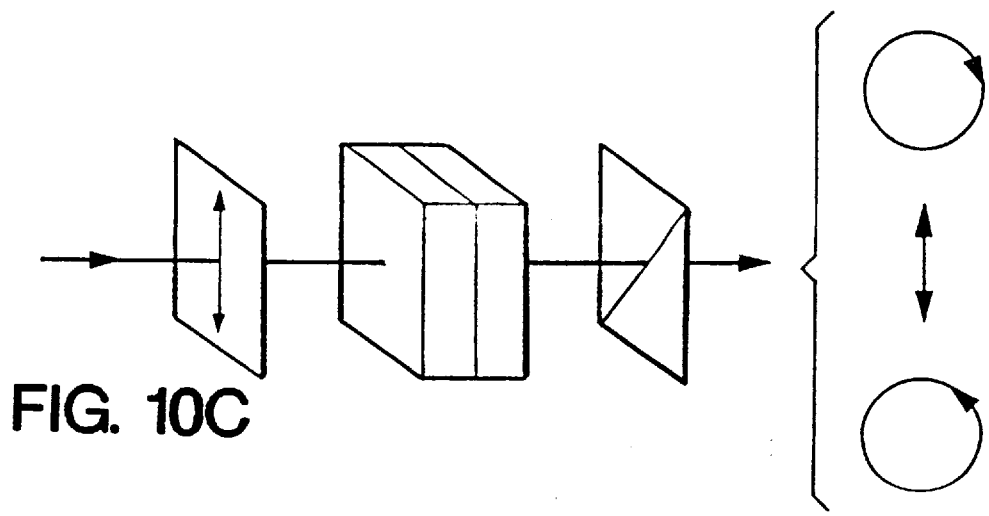

Some examples of polarization switches using double-cells are shown in FIGS. 10A–10C. The zero-field state is illustrated in FIG. 10A. One sign of the applied voltages now turns $\psi$ to zero making the incoming vertical polarization staying vertical as illustrated in FIG. 10B, whereas the other sign turns the polarization by 90 degrees. The zero field state gives circularly polarized light. By turning the back retarder 45 degrees linear polarization goes to circular and vice versa as illustrated in FIG. 10C.

Figure 11:
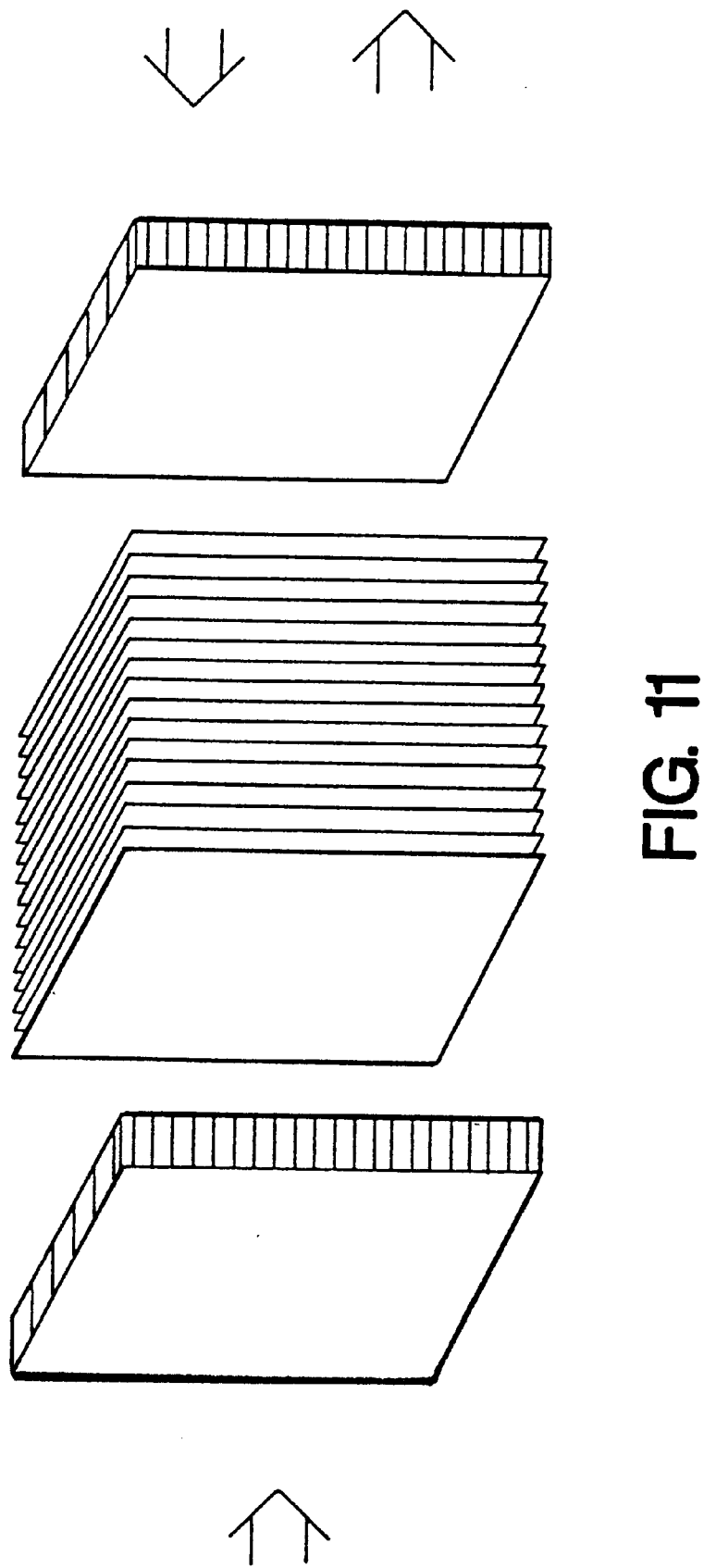
FIG. 11 is a general outline of an optical computing element, consisting of two partially covered SMFLC reflective devices, each assisted by thin film transistors, and, in between, various conventional optical elements.

An optical computing element can be obtained in a variety of LC technologies, illustrated in a general way by FIG. 11. Different threshold properties can be chosen not only by way of the liquid crystal but its combination with non linear-elements. Different logic can be chosen, like amplitude or polarization logic, the latter using binary or ternary states as just described.

In addition to the already mentioned applications, the SMFLC effect can be explored for high-speed colour switches. The cell behaves like a birefringent plate, with an almost constant phase difference $\delta$ and a field-sensitive direction of the optic axis. We can combine it with additional birefringent plates, to obtain switching between colours instead of switching between black and white. The possible change in position of the optic axis for the single cell is presently of the order $\pm 10°$, and we want here to discuss the possibilities to get significant colour changes in spite of the somewhat limited angular range of the electroclinic effect. For future materials with higher values of the induced tilt, the colour scan domain will increase accordingly. But already with available materials, there are highly interesting possibilities for colour generation, with switching between two or three significantly different colours for one electroclinic cell. With two filter combinations in series we could get switching between a great number of different colours, covering a large part of the physiological colour spectrum.

We give two examples of soft-mode cell combinations, containing fixed birefringence plates and working in transmission. The colour coordinates are calculated from the transmission spectra. The thickness of the cells has been chosen to give a phase retardation of $\lambda/2$ at some wavelength, since approximately this thickness should give maximum optical response and speed for minimum applied voltage.

The first combination may be denoted a sliding-minimum filter (see FIG. 12C). We build up this combination by starting with a polarizer and a fixed birefringence plate of optical path difference of 5460 Å, that is a normal $\lambda$ plate, turned 45°. (All angles are measured relative to the transmission direction of the polarizer). Then, we take a $\lambda/4$ plate, with path difference 1365 Å, parallel to the polarizer, followed by an SMFLC cell and an analyzer at 90°. The thickness of the soft-mode cell is 2.02 $\mu$m, which gives $\lambda/2$ plate at 5460 Å. If the optic axis of this cell can be driven from $-10°$ to $\pm 10°$ by an electric field, we will get the transmission curves displayed in FIG. 12A, where we can see how the position of the transmission minimum is displaced by the field. If light at wavelengths far from the minima are blocked by filters as indicated in FIG. 12A we can generate colours along the trace shown in the CIE diagram shown in FIG. 12B. On the way from greenish blue to orange we will pass purple and red. The parameters are not fully optimized, but are chosen to give an illustration of what can be achieved. The transmission of polarized light through the cell (weighed by the eye sensitivity) varies between 5% and 17%.

Figure 13D:
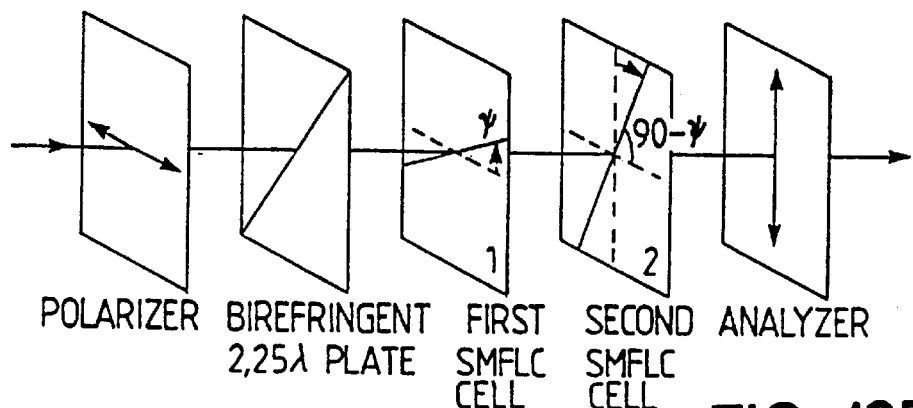
FIGS. 13A–13E illustrate a colour switching filter, made up of a combination of two pivot filters (FIGS. 13D and FIG. 13E) that allows a continuous variation of colours.
Figure 13E:
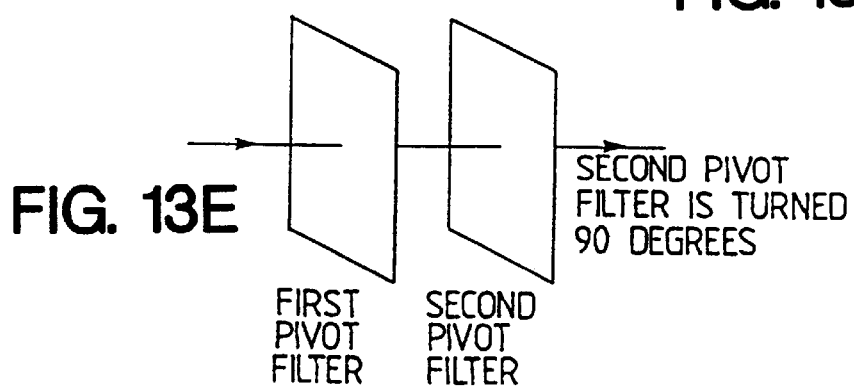
Figure 13A:
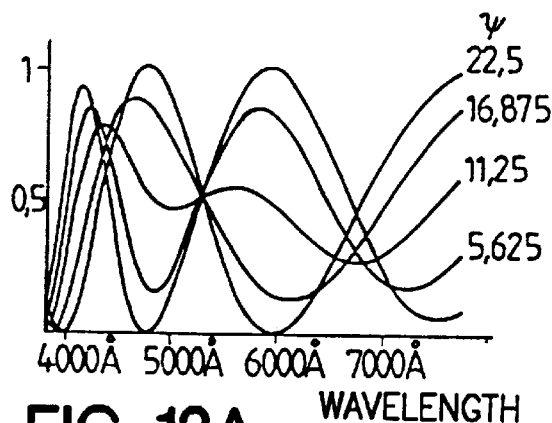
Figure 13B:
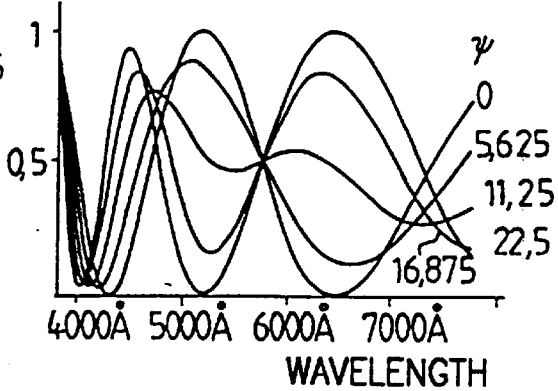
Figure 13C:
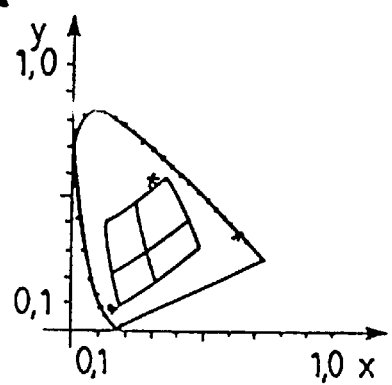

As a second example we choose a combination containing two pairs of electroclinic cells in series, with a polarizer also between the cells. The idea is that one of the cells should control the blue-yellow contrast, the other the green-red contrast. By placing two colour switches in series, one switching continuously between blue and yellow with neutral transmission in red and green, and another switching continuously between green and red, with neutral transmission for blue and yellow, all colour hues should be obtainable. Then we want each cell to generate approximately straight lines in the CIE diagram, and thus the sliding-minimum combination is unsuitable. Instead, we can work with what we denote "pivot filters" as illustrated in FIG. 13E. If we want a shift between low-blue, high-yellow and high-blue, low-yellow transmission, it is reasonable to look for transmission curves that have a pivot point, that is, a point where the transmission is independent of the position of the optic axis of the electroclinic cell, at some wavelength in green. If we then maximize the change of the derivative at this fixed point, we are likely to achieve quite good sensitivity. We will also place a fixed point in the red part of the spectrum to give the blue-yellow filter neutral green-red properties. To realize this, we put in series a polarizer, a birefringence plate of optical path difference 2.25$\lambda$, where $\lambda$=5300 Å (green) with the axis at 45° to the polarizer, then a soft-mode cell pair, and finally an analyzer (see FIG. 13D). Each electroclinic cell should have the thickness 1.93 $\mu$m, and the pair should be geometrically arranged and controlled in the same way as previously described for the cell pair in FIG. 5. This combination is now going to act as the blue-yellow filter. The green-red filter is the same combination, but with $\lambda$=5750 Å (yellow), and with each electroclinic cell of thickness 2.17 $\mu$m. The pivot filters could of course have one analyzer/polarizer in common. The optic axes of both electroclinic cell pairs are assumed to be controlled independently, with a swing of 22.5° for each cell. The transmission spectra are shown in FIGS. 13A and 13B. FIG. 13C displays the area covered in the CIE diagram. It is comparable to that of colour cathode ray tubes, and all different hues can be reached, although the colours, as in the CRT case, are not fully saturated. The transmission of the whole combination varies between 6% and 37%. The filter combinations could be optimized further to give even better characteristics, according to the demands of the possible applications. Especially, the dispersion of the fixed birefringent plates could be tailored to extend the usable wavelength range. Also the sliding-minimum filter becomes much better, but at the same time more complicated if we use a thicker retarder plate together with double electroclinic cells. We then get a "sliding-maximum" filter, with transmission maxima and minima, that could be moved along the wavelength axis by the applied field. Again, these general ideas of colour formation could, of course, also be used in devices containing ferroelectric liquid crystals in the chiral smectic-C phase, where also bigger tilt angles are available. We can also note that it is possible to incorporate multiple cells in the design of narrow band birefringent colour filters, and in this way get tunable Lyot-Öman filters or tunable Solc-filters. These could be used in various scientific instruments, where speed together with simple, compact, and robust design is attractive.

Also in the case of colour generation, reflective devices are of great interest, because of the possibility to reduce the number of active cell components in the reflective mode. In principle, the analog of the pivot filter combination of FIG. 13E could be made with only two electroclinic cells. We will lose in colour saturation compared to the pivot filter combination with four electroclinic cells, but if the filters are combined with a mirror to a thin package, the two passages of light will partly compensate for the loss in colour saturation. At the same time we will lose in brightness, and that is more critical for a reflective device than for a backlit transmissive. Thus a compromise must be made between contrast and brightness. A construction would benefit if colour selective partial polarizers could be included. Such polarizers should absorb only in yellow and blue, or only in red and green. (Also the transmissive pivot colour filters could benefit from such polarizers.) The angular dependence of the device is more critical for a reflective device than for a transmissive. With this limitation, however, the optical component would act as high speed colour mirror, capable of reflecting different colour components in the incoming light, according to the applied control voltages. In combination with the single two pass cell of FIG. 3(b) and TFT addressing, it could be used for high resolution colour video screen, with continuous colours and shades, only working in ambient light. If bistable ferroelectric liquid crystals are used instead, corresponding computer displays with a fixed number of colours could be constructed.

The orthogonal chiral smectic liquid crystals are a presently unexplored class of electro-optic materials with high-performance potential. They will be an important complement to the tilted chiral semetics, whose properties and uses in physical devices have been the object of intense research and development over the last 5 years.

The study of the physical and electro-optical properties of the smectic-Å phase, being the most important representative, and so far practically also the only available material of the orthogonal smectic class, has revealed that its applications will lie in slightly different areas than the applications of the smectic-c* phase, with a certain area of overlap. The existence of a bistable electro-optic effect in the C* phase makes this class of materials generally more useful. On the other hand, the electro-optic effect in the A* phase is the most rapid of those found in liquid crystals to date. Response times are presently of the order to 500 ns at room temperature, should become much less at elevated temperatures, and even for the future polymer A* materials we may expect values below 100 $\mu$s. Modulation linearity and available continuous gray shade add to the usefulness of the effect, together with the possibility to use it also in the ultraviolet and infrared regions. On the negative side is a limited modulation depth or contrast if high transmission is required. This is due to the limited amplitude in the induced tilt, which is the underlying basic effect (electroclinic effect). The expected forthcoming rapid development in broadband smectic-A* mixtures is likely to change this situation.

As single electro-optic components, the performance of the smectic-A* and C* devices have to be compared to those of available materials using electro-optic, magneto-optic, and acousto-optic effects. It is then clear, for instance, that a double A* cell, at least up to about 2 MHz, is a much simpler and much more versatile device than a Faraday rotator. Both A* and C* devices would also compare favourably with both Pockels, Kerr, and acoustic-optic modulators. In general terms, the unique feature of liquid crystals is that we may have a birefringence $\Delta n$ than is independent of the applied field, which only controls the direction of the optic axis. For the chiral smectic liquid crystals, there are two options: Either we have in the A* phase (or other chiral orthogonal phases) an axis direction that is a linear function of E, whereas the switching speed is independent of E, or we have in the C* phase (or other chiral tilted phases) the opposite case where the much bigger angular deviation is largely independent of E, whereas the switching speed is essentially linear in E. The values of birefringence (0.1–0.3) are giant compared to $\Delta n$ introduced by Pockels and, especially, Kerr effects. This permits very thin layers to be used and gives the component a very small physical configuration, like a normal polarizer or retarder plate, at the same time as only low voltages (<100 V) are applied. Furthermore, the acceptance angle for the incoming light is much larger than that of a Pockels cell. Together, these properties made FLC (ferroelectric liquid-crystal) devices, especially those using the soft-mode in the A* phase, very attractive for all kinds of cheap and compact shutters and modulators up to about 100 kHz (C*) or about 2 mKz (A*). Compared to the acousto-optic modulators, the FLC devices have the advantage, in spite of their overall compactness, of much higher apertures, especially as beam deflectors or in similar applications. They seem to be suitable for very much the same applications as acousto-optic modulators, e.g. image scanners, printers, and real-time signal-processing devices for correlation, spectral analysis, and more.

The virtually unlimited apertures of liquid crystal devices will also be the basis for SMFLC applications in camera shutters (high-speed photography), permitting not only exposure as time integrals, but control of the aperture function in time (square wave, sawtooth, etc.) and with all parts of the aperture field exposed simultaneously. Applications for stereoscopic displays, for instance using the rapid switching between orthogonal polarization states, as illustrated in FIGS. 10A–10C, and in automatic welding glasses and laser and flash goggles, are similar. The large available active areas also permit simple manufacturing of linear shutter arrays, which probably will replace many optical designs where mechanical devices are used for light deflection, for example, the rotating mirrors in laser printers. The more versatile control possibilities of the linear arrays make new design concepts available. Again, two chiral smectic options are available: Direct drive high-speed A* phase devices with continuous grey scale or multiplexable C* phase devices with no intrinsic grey scale.

Due to the lack of memory in the soft-mode devices, these would have to be active-matrix addressed, electrically or optically, as illustrated in FIGS. 10A–10C, for making two-dimensional discrete arrays. Such arrays, using thin-film transistors and a smectic-A* cell in reflective mode is probably the ultimate in performance for optical computing using liquid crystals, due to the high speed together with the very important depth of continuous grey shades (see FIG. 11). The same is true for nondiscrete optical processing devices, like silicon-addressed spatial light modulators.

Several examples of colour generation have already been pointed out above. One application of electroclinic colour switches would be together with black and white cathode ray tubes, where this kind of colour switch could make high resolution more easily obtainable and also allow integration with a polarization modulator for steroscopic vision. Another example is ferroelectric displays in the "sequential backlighting" approach, where the information is written to the screen one colour at a time, in a rapid time sequence, and the screen is illuminated by a synchronized sequence of coloured flashes. In such a device the inclusion of suitable electroclinic filters means that only one flash lamp is needed, instead of three flash lamps. Finally, we want to stress what we believe is a particularly interesting application of the electroclinic colour filter: Besides colour separation in colour scanners and in general colour sensors, it will, in conjunction with a charge-coupled device (CCD), permit a very simple compact, and cheap colour-TV camera, where the three colours, red, green, and blue, are electrically scanned.

What is claimed is:

1. A device for influencing light, the device comprising:

a first ferroelectric or electroclinic response type liquid crystal halfwave plate with liquid crystal material between a first set of electrodes, said liquid crystal material being in the smectic phase with bookshelf geometry;

said first liquid crystal halfwave plate having a slow optic axis which is rotatable around a first direction corresponding to that of incoming light in response to a first electric field between said first set of electrodes;

a second ferroelectric or electroclinic response type liquid crystal halfwave plate with liquid crystal material between a second set of electrodes, said liquid crystal material being in the smectic phase with bookshelf geometry;

said second liquid crystal halfwave plate having a slow optic axis which is rotatable around said first direction in response to a second electric field between said second set of electrodes;

the device being arranged such that one direction of said electrically selectable slow optic axis of said first halfwave plate is parallel to a polarizing plane of incoming polarized light when a first electric field state is applied to said first halfwave plate;

said slow optic axes of said first and second halfwave plates being perpendicular to each other when the first electric field state is applied to the first halfwave plate and a first electrically selectable slow optic axis direction of the second halfwave plate is electrically selected, thereby providing a first polarization plane of light which has passed through said plates;

said slow optic axis of said first halfwave plate being arranged to rotate in opposite angular direction to a rotation of said slow optic axis of said second halfwave plate in response to variation of the first and second electric fields, said rotation of said slow optic axis in each individual halfwave plate amounting to an angular difference of 2θ in response to a predetermined state of said first and second electric fields, so as to provide a second polarization plane of a light which has passed through said plates;

said second polarization plane being turned, in relation to said first polarization plane, by an angle 8θ in response to the predetermined state of said first and second electric fields.

2. A device according to claim 1, further comprising:

a first polarizer mounted before said first liquid crystal halfwave plate, the first polarizer polarizing light passing therethrough to a direction parallel to the slow optic axis of said first liquid crystal halfwave plate when said first electric field state is applied to said first halfwave plate; and a second polarizer mounted after said second liquid crystal halfwave plate, the second polarizer polarizing light passing therethrough to a direction perpendicular to the polarization direction of the first polarizer.

3. A device according to claim 1, further comprising:

a polarizer mounted before said first liquid crystal halfwave plate; and a quarter wave retarder plate mounted behind the first and second halfwave plates;

wherein said device is able to change a state of polarization of incoming light into three different electrically selectable polarization states of the outgoing light by varying the first and second electric fields.

4. A device according to claim 1, wherein said first and second liquid crystal halfwave plates comprise liquid crystal material, thereby rendering each plate capable of producing a rotation of 2θ in the slow optic axes corresponding to 22.5° through adjustment of the first and second electric fields.

5. A device according to claim 1, wherein an opposite rotation direction of the slow optic axes in the respective first and second halfwave plates may be accomplished by polarity of the first and second electric fields when the liquid crystals of the respective plates are of equal character.

6. A device according to claim 1, wherein an opposite rotation direction of the slow optic axes in the respective first and second halfwave plates may be accomplished by setting the first and second electric fields to equal voltage polarity when the liquid crystals of the respective plates are antipodes to each other.

7. A device according to claim 1, further comprising a birefringent plate following the halfwave plates, the birefringent plate being designed to deflect a light beam having passed through said liquid crystal halfwave plates based on a polarization state of said light beam.

8. A device according to claim 1, further comprising a birefringent prism following the halfwave plates to provide an optical switch.

9. A device according to claim 1, further comprising at least one birefringent prism following the halfwave plates, thereby producing an electrically controlled beam-splitter.

10. A device according to claim 1, further comprising:

a 2.25 λ plate;

a first polarizer provided to polarize light passing therethrough to a direction parallel to the optic axes of said first liquid crystal halfwave plate when said first electric field state is applied to the first halfwave plate;

the 2.25 λ plate being mounted with its optic axes at 45° relative to the polarization plane of said first polarizer;

a second polarizer provided to polarize light passing therethrough to a direction perpendicular to the polarization direction of the first polarizer, the said first and second halfwave plates, the 2.25 λ plate and the two polarizers being mounted as a combination along an axis of incoming light to be passed therethrough and in the direction of the incoming light, said halfwave plates, polarizers, and 2.25 λ plate comprising a first combination and being arranged in an order with the first polarizer in a first position, the 2.25 λ plate in a second position, the first halfwave plate in a third position, the second halfwave plate in a fourth position, and the second polarizer in a fifth position; and a second combination equal to said first combination being mounted after said first combination in the direction of the incoming light counted and turned 90° relative to the first combination around the propagation direction of the light passing through the device.

11. A device according to claim 10, wherein said device is a color filter for mounting in a TV camera, provided for sequentially scanning three different colors as red, blue and green colors.

* * * * *